(12) United States Patent
Liao et al.

(10) Patent No.: US 9,644,898 B2
(45) Date of Patent: May 9, 2017

(54) SYSTEMS AND METHODS FOR HEAT BALANCE AND TRANSPORT FOR AIRCRAFT HYDRAULIC SYSTEMS

(71) Applicant: The Boeing Company, Seal Beach, CA (US)

(72) Inventors: Jianmin Liao, Bothell, WA (US); Ty Aaby Larsen, Everett, WA (US); Bruce L. Drolen, Altadena, CA (US)

(73) Assignee: The Boeing Company, Chicago, IL (US)

( * ) Notice: Subject to any disclaimer, the term of this patent is extended or adjusted under 35 U.S.C. 154(b) by 558 days.

(21) Appl. No.: 14/151,291

(22) Filed: Jan. 9, 2014

(65) Prior Publication Data

US 2015/0013954 A1 Jan. 15, 2015

Related U.S. Application Data

(63) Continuation-in-part of application No. 13/937,490, filed on Jul. 9, 2013.

(51) Int. Cl.
*F28D 15/00* (2006.01)
*F28D 15/04* (2006.01)
(Continued)

(52) U.S. Cl.
CPC .............. *F28D 15/04* (2013.01); *F15B 18/00* (2013.01); *F15B 21/042* (2013.01); *F28D 15/0233* (2013.01)

(58) Field of Classification Search
CPC ...... F28D 15/02; F28D 15/04; F28D 15/0233; F25B 18/00; F25B 21/042
(Continued)

(56) References Cited

U.S. PATENT DOCUMENTS 3,699,847 A 10/1972 Little
5,100,082 A * 3/1992 Archung ............... B64D 41/00
244/76 R
(Continued)

FOREIGN PATENT DOCUMENTS

CN 102101425 A 6/2011
CN 102575532 A 7/2012
(Continued)

OTHER PUBLICATIONS

EPO Extended Search Report dated Feb. 2, 2015 for related application 14172816.2; 4 pp.
(Continued)

*Primary Examiner* — Len Tran
*Assistant Examiner* — Claire Rojohn, III
(74) *Attorney, Agent, or Firm* — Armstrong Teasdale LLP

(57) ABSTRACT

A thermal management system includes a first hydraulic system for circulating a first hydraulic fluid at a first temperature and a second hydraulic system for circulating a second hydraulic fluid at a second temperature that is higher than the first temperature. The thermal management system also includes a sealed heat transfer device coupled between the first hydraulic system and the second hydraulic system. The sealed heat transfer device is not in flow communication with either of the first hydraulic system and the second hydraulic system. The sealed heat transfer device is configured to transfer heat from the second hydraulic fluid to the first hydraulic fluid.

15 Claims, 18 Drawing Sheets

(51) Int. Cl.
*F28D 15/02* (2006.01)
*F15B 18/00* (2006.01)
*F15B 21/04* (2006.01)

(58) Field of Classification Search
USPC .............. 165/41, 42, 104.19, 104.21, 104.26
See application file for complete search history.

(56) References Cited

U.S. PATENT DOCUMENTS

| | | | |
|---|---|---|---|
| 5,615,547 | A | 4/1997 | Beutin et al. |
| 6,135,065 | A | 10/2000 | Weathers et al. |
| 6,354,089 | B1 | 3/2002 | Lech et al. |
| 6,415,595 | B1 | 7/2002 | Wilmot, Jr. et al. |
| 6,966,180 | B2 * | 11/2005 | Deneir .................. F04B 49/08 60/327 |
| 7,520,465 | B2 | 4/2009 | Mahjoub |
| 8,484,962 | B2 * | 7/2013 | Behr ....................... B64C 13/40 244/99.5 |
| 9,004,154 | B2 * | 4/2015 | Hagshenas .............. F01M 5/00 165/279 |
| 9,051,056 | B2 * | 6/2015 | Leese ...................... B64D 37/34 |
| 2008/0283223 | A1 * | 11/2008 | Chang .................... F28D 15/043 165/104.26 |
| 2009/0025811 | A1 | 1/2009 | Zagni et al. |
| 2009/0229794 | A1 * | 9/2009 | Schon ....................... F24J 2/12 165/104.21 |
| 2009/0321062 | A1 | 12/2009 | Ebigt et al. |
| 2010/0170238 | A1 | 7/2010 | Behr et al. |
| 2010/0221627 | A1 * | 9/2010 | Nakakubo ........... F28D 15/0266 429/434 |
| 2010/0300653 | A1 | 12/2010 | Bonner |
| 2011/0036544 | A1 | 2/2011 | Shirai et al. |
| 2012/0043055 | A1 | 2/2012 | Byon et al. |
| 2012/0175080 | A1 | 7/2012 | Muehthaler et al. |
| 2013/0037234 | A1 | 2/2013 | Mackin |
| 2013/0068885 | A1 | 3/2013 | Onomichi et al. |

FOREIGN PATENT DOCUMENTS

| | | |
|---|---|---|
| CN | 102765320 A | 11/2012 |
| EP | 0721061 A1 | 7/1996 |
| EP | 2570344 A2 | 3/2013 |
| FR | 2862724 A1 | 5/2005 |
| WO | 2004025094 A1 | 3/2004 |

OTHER PUBLICATIONS

U.S. Appl. No. 13/937,490, filed Jul. 9, 2013 entitled Systems and Methods for Heat Balance and Transport for Aircraft Hydraulic Systems.
U.S. Appl. No. 13/460,763, filed Apr. 30, 2012 entitled Hydraulic Fluid Heat Dissipation Control Assembly and Method.
Thermal Design and Heat Sink Manufacturing & Testing—Total Thermal and Heat Sink Solutions from Enertron, Inc., Heat Pipe Selection (2006) retrieved from website http://www.enertron-inc.com/enertron-products/heat-pipe-selection. php (4 pgs).
Bell et al.; "Wolverine Engineering Data Book II" 2001, Wolverine Tube Inc. (electronic handbook); retrieved Sep. 16, 2015 from URL: http://web.archive.org/web/20050204152121/http://www.wlv.com/products/databook/databook.pdf; 46 pp.
China Office Action for related application 201410324561.7, dated Jan. 4, 2017, 16 pp.

* cited by examiner

SYSTEMS AND METHODS FOR HEAT BALANCE AND TRANSPORT FOR AIRCRAFT HYDRAULIC SYSTEMS

CROSS REFERENCE TO RELATED APPLICATION

This application is a continuation-in-part of U.S. application Ser. No. 13/937,490, filed Jul. 9, 2013, the disclosure of which is hereby incorporated by reference in its entirety.

BACKGROUND

The present disclosure relates generally to thermal management, and more particularly to systems and methods for use in balancing and transporting heat among hydraulic systems within an aircraft.

In at least some known aircraft, heat from one or more hydraulic systems is dissipated into fuel through a heat exchanger located inside a fuel tank. Other known aircraft have no hydraulic system heat exchangers and address hydraulic fluid heating through restrictions and limitations on operation of such aircraft when an outside ambient temperature is above a predetermined threshold. Additionally, some known aircraft include a thermostat control to selectively cause hydraulic fluid to bypass a heat exchanger, in order to retain heat and to reduce pressure loss in hydraulic lines when the outside ambient temperature is below a predetermined threshold. Additionally, some known aircraft use hydraulic system circulating flow to control the temperature of hydraulic fluid. More specifically, in such aircraft, hydraulic orifice valves are installed in extremities of hydraulic systems to adjust system internal leakage so as to control heat generated through the orifices and total heat loss from hydraulic tubing to the ambient. Additionally, some known aircraft use guided ram air flow to cool the temperature of hydraulic fluid. Accordingly, such systems require substantial modification to structural surfaces of an aircraft. In summary, there exists a need for a cost-effective and efficient system for heating and cooling of hydraulic fluid within an aircraft.

BRIEF DESCRIPTION

In one aspect, a thermal management system is provided. The thermal management system includes a first hydraulic system for circulating a first hydraulic fluid at a first temperature and a second hydraulic system for circulating a second hydraulic fluid at a second temperature that is higher than the first temperature. The thermal management system also includes a sealed heat transfer device coupled between the first hydraulic system and the second hydraulic system. The sealed heat transfer device is not in flow communication with either of the first hydraulic system and the second hydraulic system. The sealed heat transfer device is configured to transfer heat from the second hydraulic fluid to the first hydraulic fluid.

In another aspect, an aircraft is provided. The aircraft includes a first hydraulic system for circulating a first hydraulic fluid at a first temperature and a second hydraulic system for circulating a second hydraulic fluid at a second temperature that is higher than the first temperature. The aircraft also includes a sealed heat transfer device coupled between the first hydraulic system and the second hydraulic system. The sealed heat transfer device is not in flow communication with either of the first hydraulic system and the second hydraulic system. The sealed heat transfer device is configured to transfer heat from the second hydraulic fluid to the first hydraulic fluid.

In another aspect, a method for managing temperatures in a machine is provided. The method includes circulating a first hydraulic fluid at a first temperature through a first hydraulic system coupled to the machine and circulating a second hydraulic fluid at a second temperature that is higher than the first temperature through a second hydraulic system coupled to the machine. The method also includes transferring heat from the second hydraulic fluid to the first hydraulic fluid through a sealed heat transfer device coupled between the first hydraulic system and the second hydraulic system. The sealed heat transfer device is not in flow communication with either of the first hydraulic system and the second hydraulic system.

DETAILED DESCRIPTION

Figure 1:
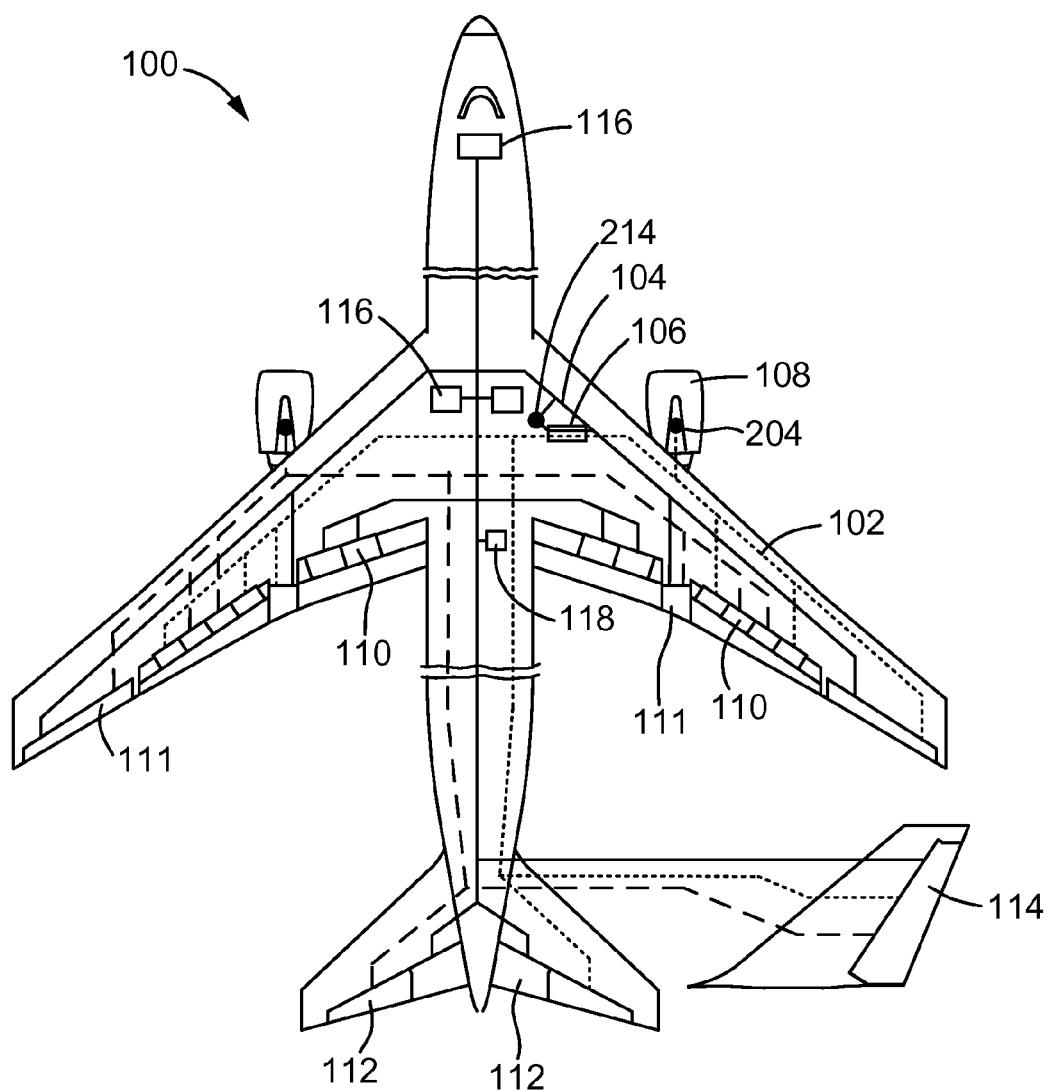
FIG. 1 is a diagram of an example aircraft that includes hydraulic systems and aircraft operating components that are powered by the hydraulic systems.

FIG. 1 is a diagram of an aircraft 100 that includes a first hydraulic system 102 and a second hydraulic system 104. First hydraulic system 102 and second hydraulic system 104 are coupled together by a heat exchanger 106. First hydraulic system 102 is pressurized by a pump device 204 that is driven by an engine 108 of aircraft 100 and provides power for certain operating components of aircraft 100. For example, first hydraulic system 102 powers at least one spoiler 110, at least one aileron 111, at least one elevator 112, and/or at least one rudder 114 in aircraft 100. Additionally, second hydraulic system 104 powers components of aircraft 100 similar to the first hydraulic system and, in addition, other components that are not powered by first hydraulic system 102. For example, second hydraulic system 104 powers landing gear 116 and/or brakes 118 of aircraft 100. In some implementations, first hydraulic system 102 is routed in a way that more heat is dissipated from hydraulic tubing to surrounding ambient and causes hydraulic fluid within first hydraulic system 102 to be colder than hydraulic fluid in second hydraulic system 104. In some implementations, second hydraulic system 104 uses a pump 214 that may be different from pump 204 used in first hydraulic system 102 and may generate more heat than pump 204, resulting in a warmer second hydraulic system 104. In some implementations, aircraft 100 may include additional hydraulic systems that power other components of aircraft 100. Additionally, in some implementations, aircraft 100 is any other machine that includes at least two hydraulic systems coupled by heat exchanger 106.

Figure 2:
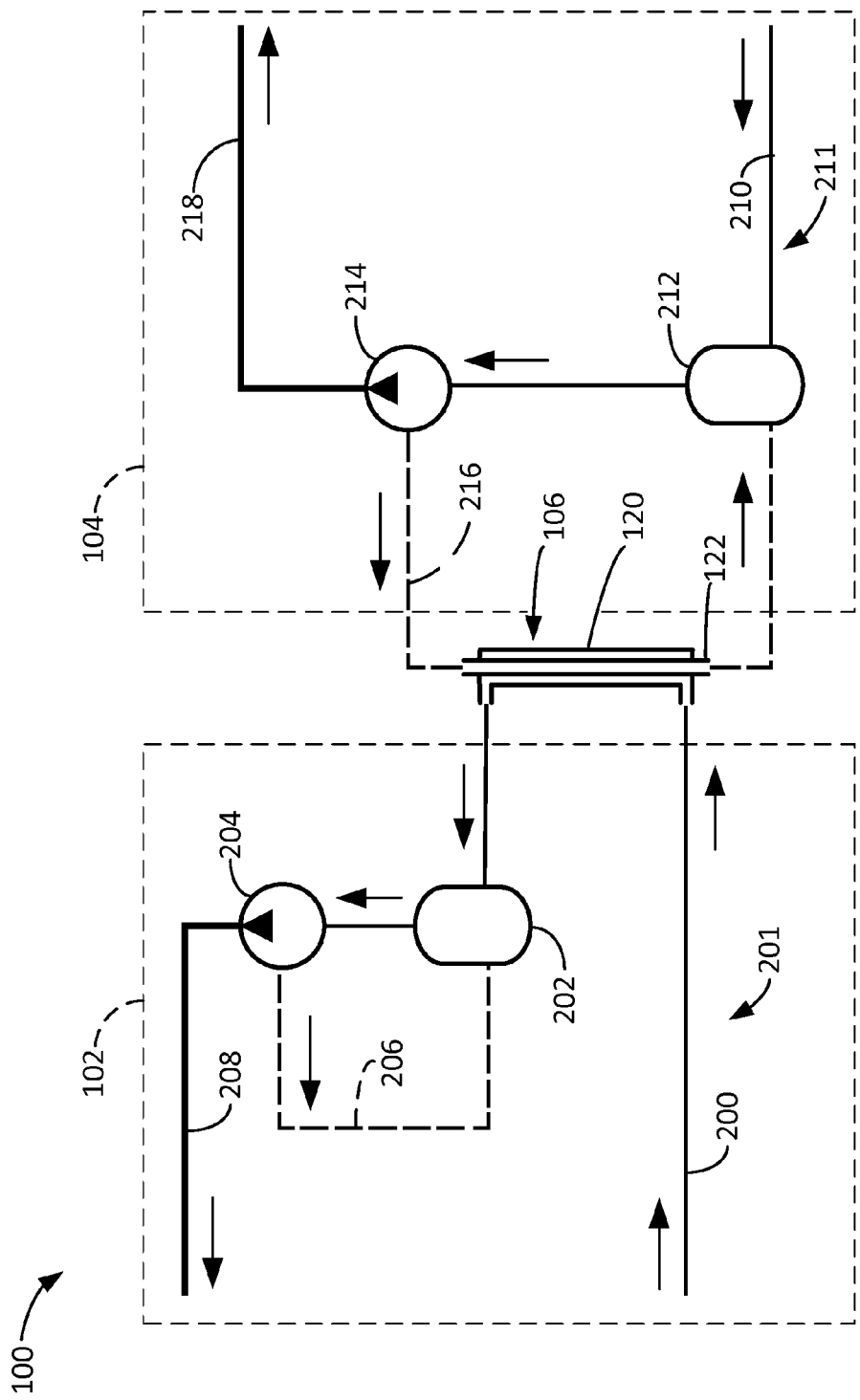
FIG. 2 is a block diagram of a first example configuration of the hydraulic systems of the aircraft of FIG. 1.

FIG. 2 is a block diagram of a first example configuration of first hydraulic system 102 and second hydraulic system 104. Heat exchanger 106 couples first hydraulic system 102 with second hydraulic system 104 such that heat is exchanged from second hydraulic system 104 to first hydraulic system 102. Heat exchanger 106 includes a first tube 120 and a second tube 122. First tube 120 is coupled in flow communication with first hydraulic system 102 and second tube 122 is coupled in flow communication with second hydraulic system 104. First tube 120 surrounds second tube 122, thereby enabling heat to be exchanged between first hydraulic system 102 and second hydraulic system 104 without mixing first hydraulic fluid 201 with second hydraulic fluid 211.

In first hydraulic system 102, a first hydraulic fluid 201 flows through a return line 200, which may be a trunk return line, through first tube 120 of heat exchanger 106, and then to a reservoir 202. A pump 204 is located downstream of reservoir 202 and pumps first hydraulic fluid 201 through a pressure line 208. A case drain 206 is coupled to pump 204 and to reservoir 202 and routes any of first hydraulic fluid 201 that leaks out of pump 204 back to reservoir 202. In second hydraulic system 104, a second hydraulic fluid 211 flows through a return line 210 to a reservoir 212 and then to a pump 214. Pump 214 pumps second hydraulic fluid 211 through a pressure line 218. Additionally, a case drain 216 is coupled to pump 214 and to reservoir 212. Case drain 216 routes any of second hydraulic fluid 211 that leaks out of pump 214 through second tube 122 of heat exchanger 106 and back to reservoir 212. As a characteristic of a hydraulic pump, for example pump 204, case drain fluid carries heat due to pump inefficiency and is, for example, 30 degrees Fahrenheit hotter than the pump inlet fluid from a reservoir, for example reservoir 202. Therefore, fluid in case drain 206 of pump 204 may be, for example, 30 degrees Fahrenheit hotter than fluid in reservoir 202 and fluid in case drain 216 of pump 214 may be, for example, approximately 30 degrees Fahrenheit hotter than fluid in reservoir 212. Additionally, second hydraulic system 104 may be, for example, 20 degrees Fahrenheit hotter than first hydraulic system 102, as described above. As a result, second hydraulic fluid 211 flowing through second tube 122 of heat exchanger 106 may be maintained at a higher temperature (for example, approximately 50 degrees Fahrenheit, assuming no heat is exchanged) than first hydraulic fluid 201 flowing through first tube 120 of heat exchanger 106.

Figure 3:
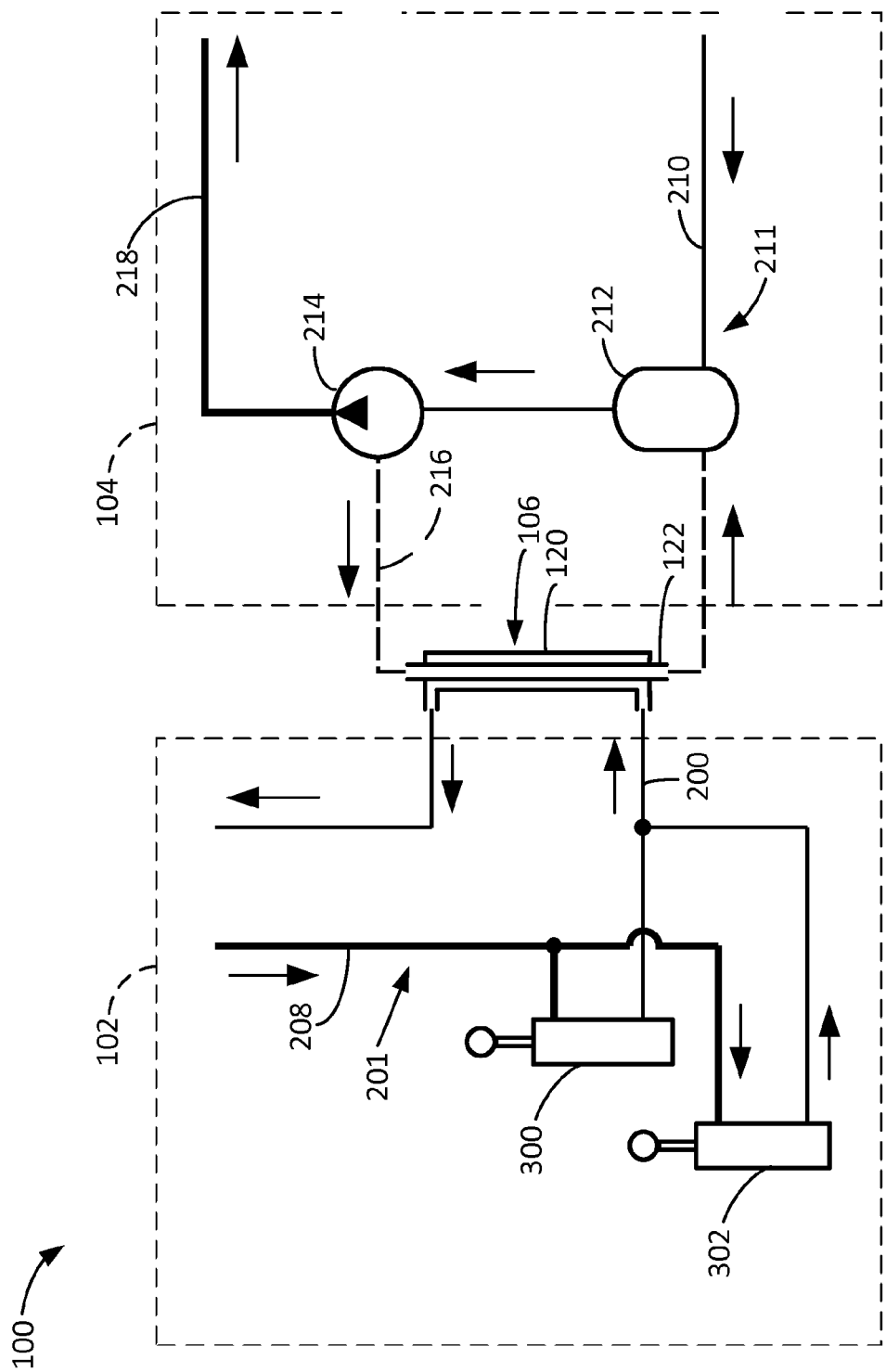
FIG. 3 is a block diagram of a second example configuration of the hydraulic systems of the aircraft of FIG. 1.

FIG. 3 is a block diagram of a second example configuration of first hydraulic system 102 and second hydraulic system 104 of aircraft 100. More specifically, heat exchanger 106 couples first hydraulic system 102 with second hydraulic system 104 in a different location than in FIG. 2. In first hydraulic system 102, first hydraulic fluid 201 flowing through pressure line 208 is received in a first actuator 300, which may control, for example, spoiler 110 (shown in FIG. 1) and a second actuator 302, which may control, for example, elevator 112 (shown in FIG. 1). First hydraulic fluid 201 then passes through return line 200, which may be a branch return line, and through first tube 120 of heat exchanger 106. Second hydraulic system 104 is configured as described with reference to FIG. 2. The configuration shown in FIG. 3 may be used instead of or in addition to the configuration shown in FIG. 2 depending on design considerations, for example available space for components and/or how close first hydraulic system 102 is to second hydraulic system 104 at various points in aircraft 100.

Figure 4:
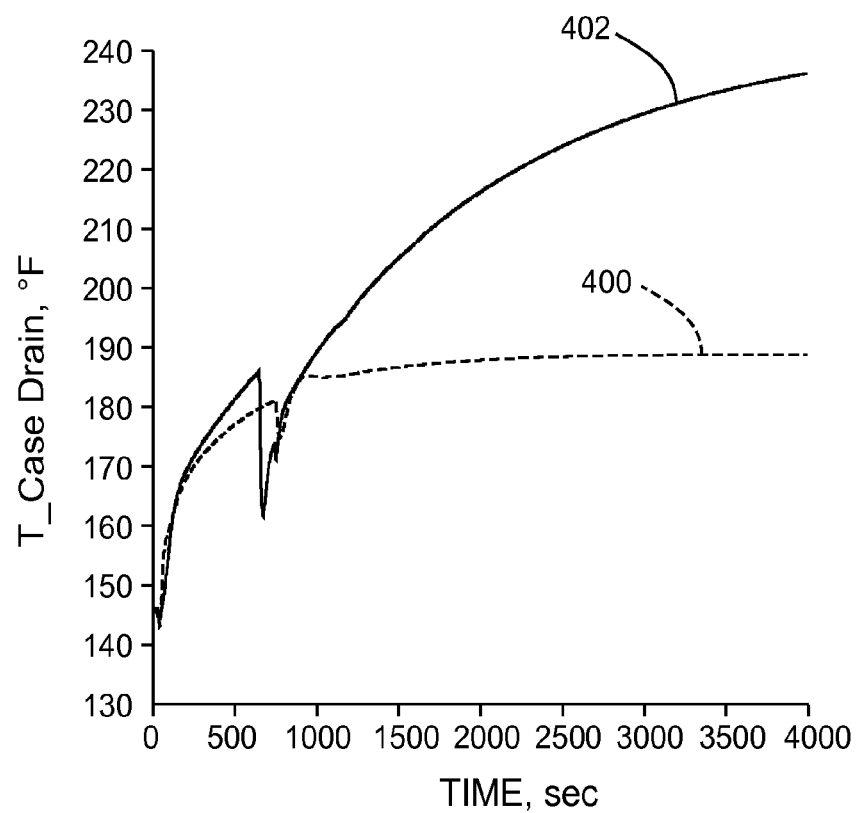
FIG. 4 is a graph of temperatures of the hydraulic systems of FIG. 1 when the hydraulic systems are not coupled by a heat exchanger.

FIG. 4 is a graph of temperatures of first hydraulic system 102 and second hydraulic system 104 when first hydraulic system 102 and second hydraulic system 104 are not coupled together by heat exchanger 106. The outside ambient temperature is a first ambient temperature. The temperature of first hydraulic fluid 201 in case drain 206 is represented by curve 400 and the temperature of second hydraulic fluid 211 in case drain 216 is represented by curve 402. As time progresses, the temperature in case drain 216 exceeds the temperature in case drain 206. After a first time period elapses, the temperature in case drain 216 is a first number of degrees Fahrenheit higher than the temperature in case drain 206.

Figure 5:
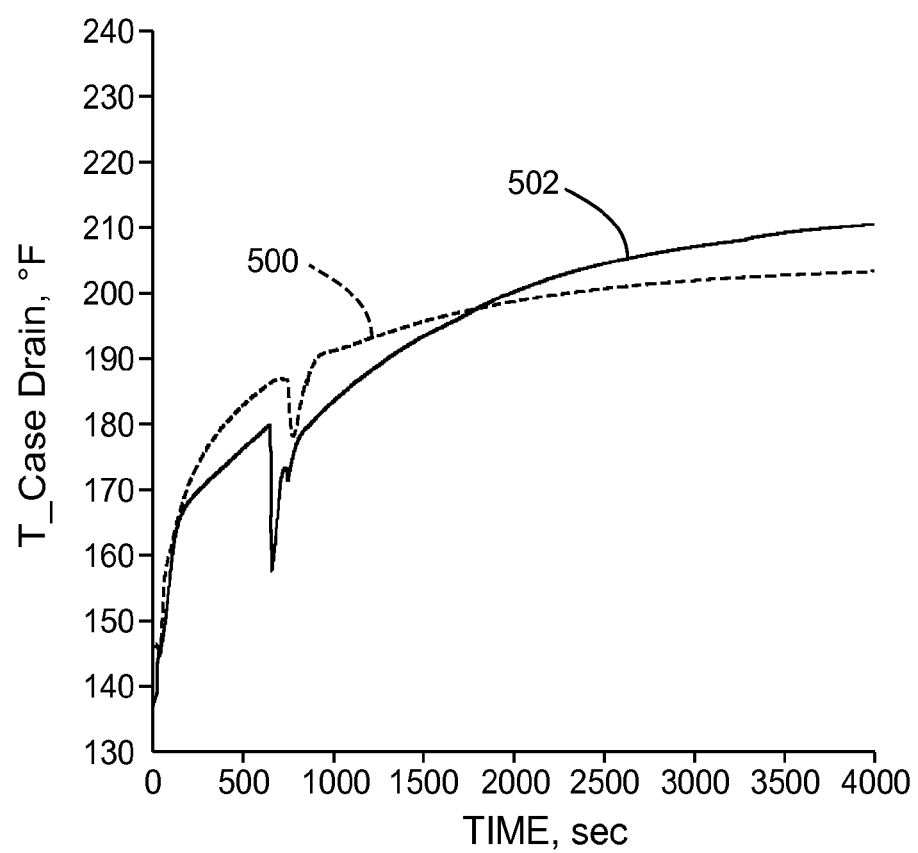
FIG. 5 is a graph of temperatures of the hydraulic systems of FIG. 1 when the hydraulic systems are coupled by a heat exchanger.

FIG. 5 is a graph of temperatures of first hydraulic system 102 and second hydraulic system 104 when first hydraulic system 102 and second hydraulic system 104 are coupled together by heat exchanger 106. The outside ambient temperature is, again, the first ambient temperature. The temperature of first hydraulic fluid 201 in case drain 206 is represented by curve 500 and the temperature of second hydraulic fluid 211 in case drain 216 is represented by curve 502. As compared to curves 400 and 402 of FIG. 4, curves 500 and 502 indicate that, after the first time period has elapsed, the temperatures in case drains 206 and 216 differ by a second number of degrees that is less than the first number of degrees. More specifically, heat exchanger 106 facilitates cooling second hydraulic fluid 211 in second hydraulic system 104 by transferring heat to first hydraulic fluid 201 in first hydraulic system 102.

Figure 6:
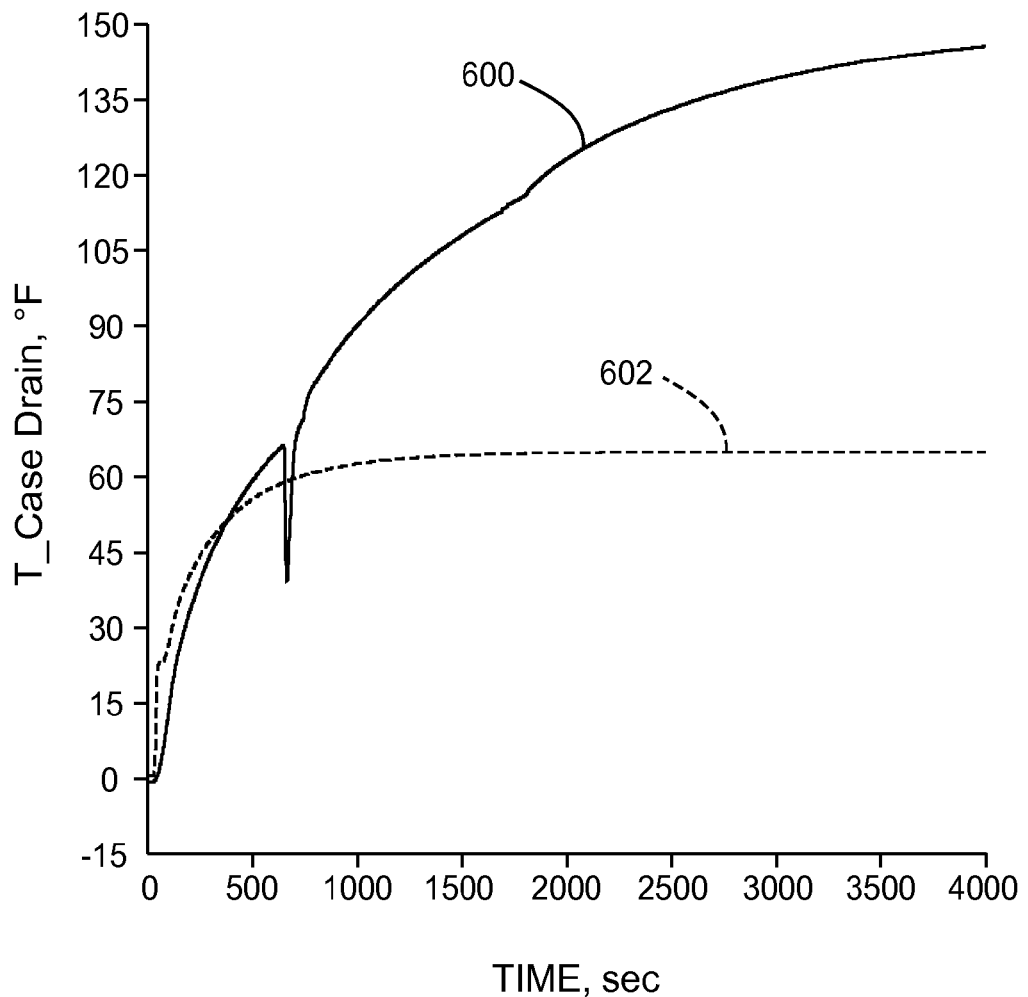
FIG. 6 is another graph of temperatures of the hydraulic systems of FIG. 1 when the hydraulic systems are not coupled by a heat exchanger.

FIG. 6 is another graph of temperatures of first hydraulic system 102 and second hydraulic system 104 when first hydraulic system 102 and second hydraulic system 104 are not coupled together by heat exchanger 106. The outside ambient temperature is a second ambient temperature that is less than the first ambient temperature. The temperature of second hydraulic fluid 211 in case drain 216 is represented by curve 600 and the temperature of first hydraulic fluid 201 in case drain 206 is represented by curve 602. As time progresses, the temperature in case drain 216 exceeds the temperature in case drain 206. After the first time period has elapse, the temperature in case drain 216 is a third number of degrees Fahrenheit higher than the temperature in case drain 206. The temperature of case drain 206 is stabilized and the temperature of reservoir 202 is lower than the temperature of case drain 206. The temperature of reservoir 202 is considered representative of a hydraulic system temperature that may not provide a preferred amount of hydraulic power for takeoff.

Figure 7:
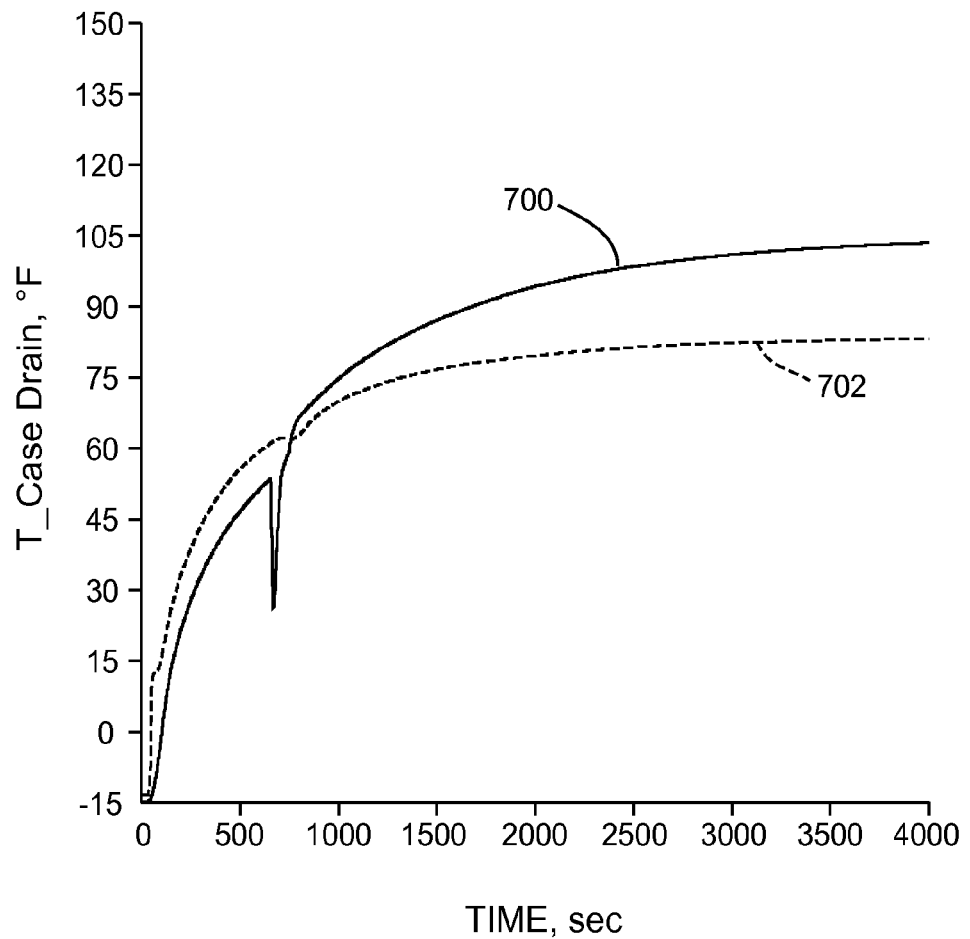
FIG. 7 is another graph of temperatures of the hydraulic systems of FIG. 1 when the hydraulic systems are coupled by a heat exchanger.

FIG. 7 is another graph of temperatures of first hydraulic system 102 and second hydraulic system 104 when first hydraulic system 102 and second hydraulic system 104 are coupled together by heat exchanger 106. The outside ambient temperature is, again, the second ambient temperature. The temperature of second hydraulic fluid 211 in case drain 216 is represented by curve 700 and the temperature of first hydraulic fluid 201 in case drain 206 is represented by curve 702. As compared to curves 600 and 602 of FIG. 6, curves 700 and 702 indicate that the temperatures in case drains 206 and 216 differ by a fourth number of degrees Fahrenheit after the first time period has elapsed. The fourth number of degrees is less than the third number of degrees discussed with reference to FIG. 6. More specifically, heat exchanger 106 facilitates heating first hydraulic fluid 201 in first hydraulic system 102 with heat transferred from second hydraulic fluid 211 in second hydraulic system 104.

Figure 8:
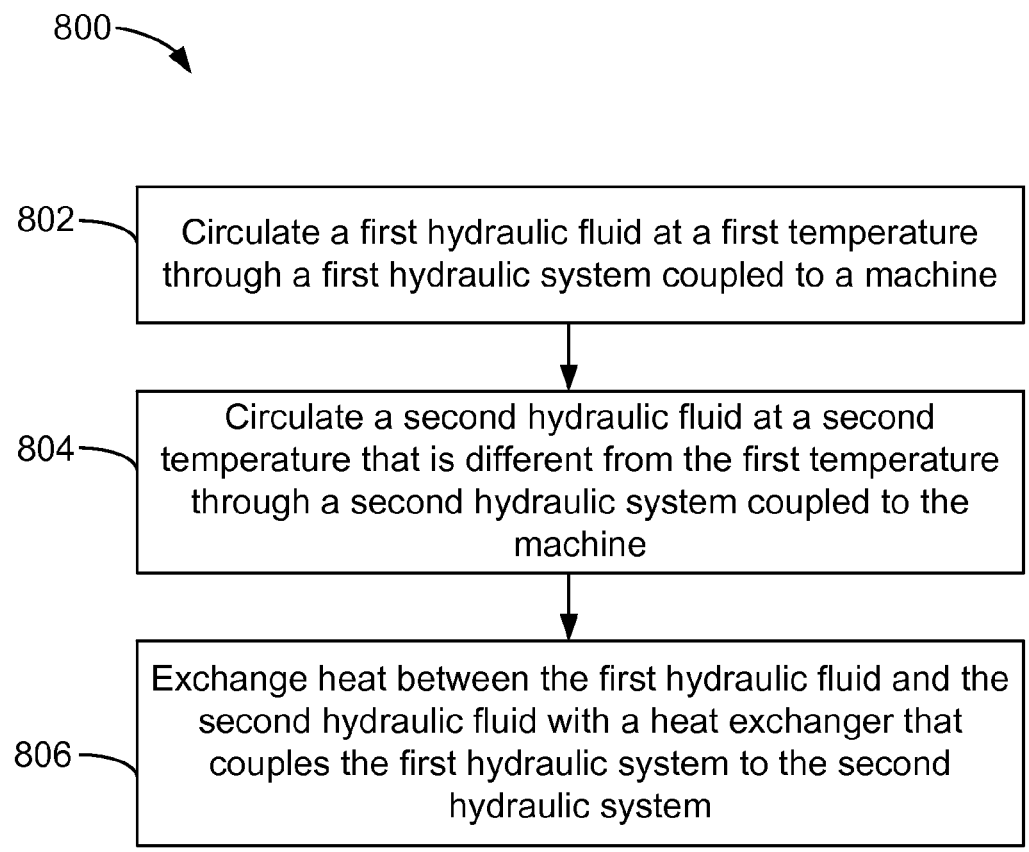
FIG. 8 is a flowchart of a method for managing temperatures in a machine, such as the aircraft of FIG. 1.

FIG. 8 is a flowchart of a method 800 for managing temperatures in a machine, such as aircraft 100 (shown in FIG. 1). Method 800 includes circulating 802 a first hydraulic fluid, for example first hydraulic fluid 201, at a first temperature through a first hydraulic system, for example first hydraulic system 102. First hydraulic system 102 is coupled to a machine, for example aircraft 100. Additionally, method 800 includes circulating 804 a second hydraulic fluid, for example second hydraulic fluid 211, at a second temperature that is different from the first temperature through a second hydraulic system, for example second hydraulic system 104. Second hydraulic system 104 is coupled to the machine, for example aircraft 100. Method 800 additionally includes exchanging 806 heat between the first hydraulic fluid 201 and the second hydraulic fluid 211 with a heat exchanger that couples first hydraulic system 102 to second hydraulic system 104. The heat exchanger may be, for example, heat exchanger 106.

Figure 9:
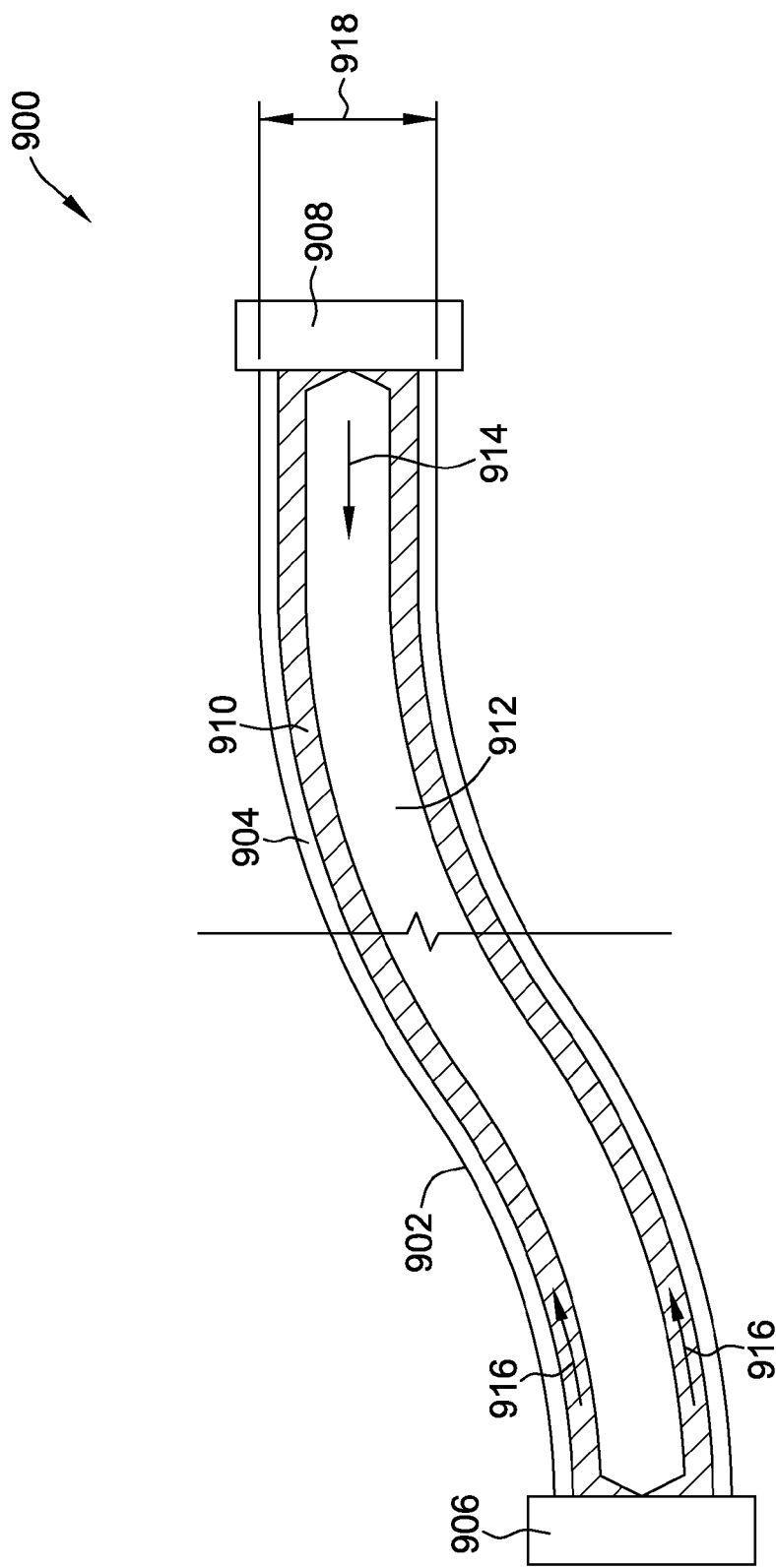
FIG. 9 is a schematic illustration of an exemplary embodiment of a sealed heat transfer device.

In some embodiments, heat exchanger 106 is a sealed heat transfer device 900. The term "sealed" refers to the fact that heat transfer device 900 contains a working fluid 912, but is not coupled in flow communication with first hydraulic system 102 or second hydraulic system 104. FIG. 9 is a schematic illustration of an exemplary embodiment of sealed heat transfer device 900 implemented as a heat pipe 902. In the exemplary embodiment, heat pipe 902 includes a substantially sealed tube 904 extending longitudinally between a cold interface 906 and a hot interface 908. Cold interface 906 is configured to be coupled to, and to permit transfer heat to, a relatively colder structure (not shown), and hot interface 908 is configured to be coupled to, and to permit heat transfer from, a relatively hotter structure (not shown). A wicking structure 910 extends substantially longitudinally within at least a portion of tube 904. In one embodiment, wicking structure 910 is formed from a plurality of thin metal grooves (not shown) that extend substantially longitudinally along at least a portion of tube 904, each groove having an effective width configured to induce liquid to flow therethrough due to capillary action. In alternative embodiments, wicking structure 910 is any suitable structure configured to induce liquid to flow therethrough due to capillary action.

A working fluid 912 disposed within tube 904 transfers heat from hot interface 908 to cold interface 906. More specifically, working fluid 912 is disposed within tube 904 in an amount such that working fluid 912 exists partially in a liquid phase and partially in a vapor phase within tube 904 throughout an operating temperature range of heat pipe 902. In the exemplary embodiment, tube 904 is at least partially evacuated before or during the insertion of working fluid 912 into tube 904. In alternative embodiments, a non-condensable gas such as argon is added to tube 902 in addition to working fluid 912.

Working fluid 912 near hot interface 908 absorbs heat from hot interface 908 and evaporates into a vapor 914, which expands and travels toward cold interface 906. In turn, working fluid 912 near cold interface 906 loses heat to cold interface 906 and condenses into a liquid 916, which is absorbed into wicking structure 910. Capillary action within wicking structure 910 transfers liquid 916 toward hot interface 908 to complete a self-contained heat transfer flow circuit within heat pipe 902. Wicking structure 910 enables heat pipe 902 to operate regardless of a relative elevation of cold interface 906 and hot interface 908.

Working fluid 912, and a compatible material for tube 904, may be chosen based on a desired operating temperature range of heat pipe 902. In one embodiment, heat pipe 902 operates within a temperature range of about 40 degrees Fahrenheit to about 450 degrees Fahrenheit, working fluid 912 is water, and tube 904 is formed from at least one of copper and nickel. In another embodiment, heat pipe 902 operates within a temperature range of about −50 degrees Fahrenheit to about 250 degrees Fahrenheit, working fluid 912 is methanol, and tube 904 is formed from at least one of copper, nickel, and stainless steel. In alternative embodiments, other suitable combinations of working fluid 912 and a material for tube 904 are used based on a desired operating temperature range of heat pipe 902. As used herein, the operating temperature range is defined as the temperature range that working fluid 912 within sealed heat transfer device 900 experiences over the full range of operation of the platform, such as aircraft 100, on which it is installed. In any given operational condition, working fluid 912 will reach an equilibrium operational temperature that is between the temperature to which cold interface 906 is exposed and the temperature to which hot interface 908 is exposed, typically with only minor internal temperature variations within working fluid 912.

Figure 10:
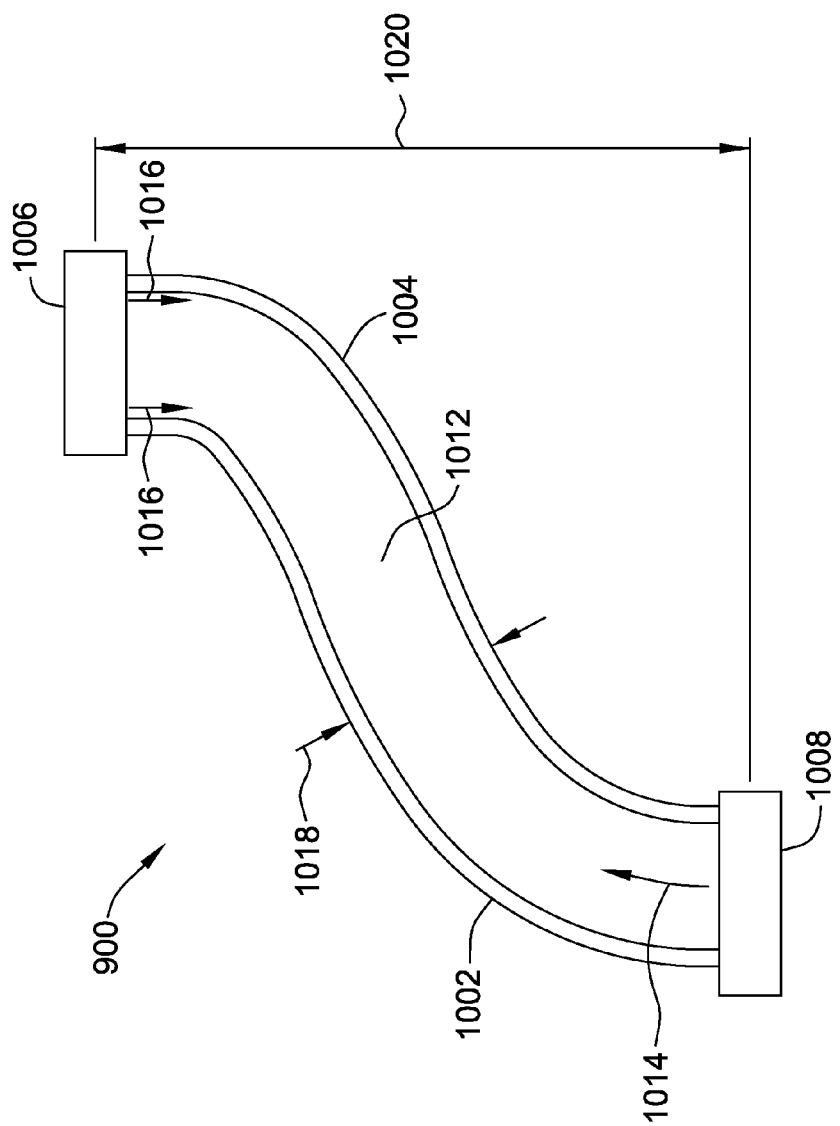
FIG. 10 is a schematic illustration of another exemplary embodiment of a sealed heat transfer device.

FIG. 10 is a schematic illustration of an alternative embodiment of sealed heat transfer device 900 implemented as a thermosyphon 1002. Similarly to heat pipe 902, thermosyphon 1002 includes a sealed tube 1004 extending between a cold interface 1006 and a hot interface 1008. Cold interface 1006 is configured to be coupled to, and to permit transfer heat to, a relatively colder structure (not shown), and hot interface 1008 is configured to be coupled to, and to permit heat transfer from, a relatively hotter structure (not shown).

A working fluid 1012 disposed within tube 1004 transfers heat from hot interface 1008 to cold interface 1006. More specifically, working fluid 1012 is disposed within tube 1004 in an amount such that working fluid 1012 exists partially in a liquid phase and partially in a vapor phase within tube 1004 throughout an operating temperature range of thermosyphon 1002. In the exemplary embodiment, tube 1004 is at least partially evacuated before or during the insertion of working fluid 1012 into tube 1004. In alternative embodiments, a non-condensable gas such as argon is added to tube 1002 in addition to working fluid 1012.

Working fluid 1012 near hot interface 1008 absorbs heat from hot interface 1008 and evaporates into a vapor 1014, which expands and travels upward toward cold interface 1006. In turn, working fluid 1012 near cold interface 1006 loses heat to cold interface 1006 and condenses into a liquid 1016. However, unlike heat pipe 902, thermosyphon 1002 need not include a wicking structure. Instead, the force of gravity causes liquid 1016 to travel downward toward hot interface 1008, while vapor 1014 heated by hot interface 1008 rises toward cold interface 1006 due to natural buoyancy to complete a self-contained heat transfer flow circuit within thermosyphon 1002. An elevation 1020 of cold interface 1006 relative to hot interface 1008 enables thermosyphon 1002 to operate regardless of the presence of a wicking structure.

In certain embodiments, working fluid 1012 and compatible materials for tube 1004 for a desired operating temperature range of thermosyphon 1002 are substantially the same as those described above for heat pipe 902. In alternative embodiments, other suitable combinations of working fluid 1012 and a material for tube 1004 are used.

Figure 11:
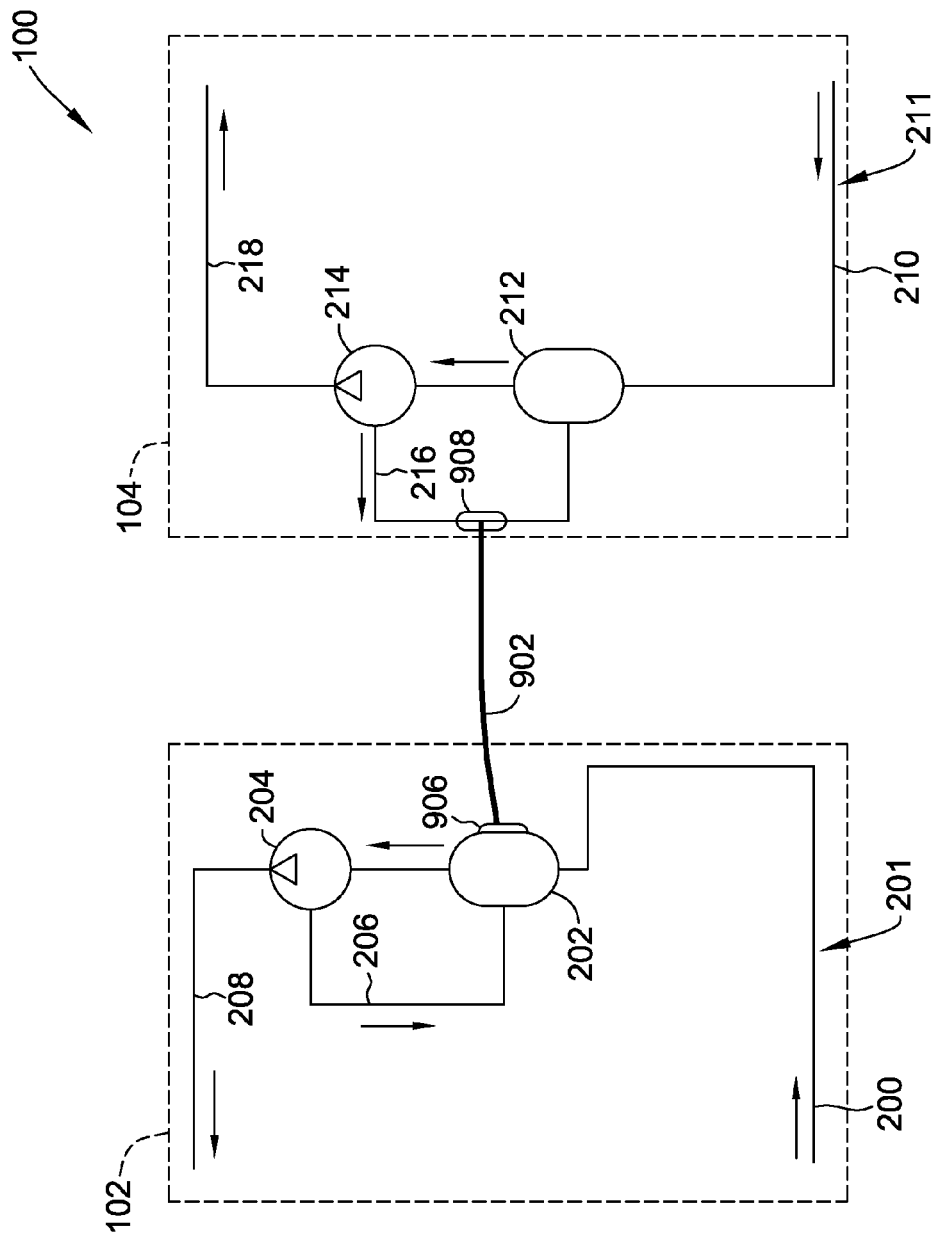
FIG. 11 is a block diagram of a third example configuration of the hydraulic systems of the aircraft of FIG. 1.

FIG. 11 is a block diagram of a third example configuration of first hydraulic system 102 and second hydraulic system 104 in which sealed heat transfer device 900, implemented as heat pipe 902, is coupled to first hydraulic system 102 and second hydraulic system 104. More specifically, cold interface 906 is coupled to reservoir 202 of first hydraulic system 102, and hot interface 908 is coupled to case drain 216 of second hydraulic system 104. In the exemplary embodiment, hot interface 908 is configured to encapsulate a portion of case drain 216 to facilitate increasing a heat transfer from case drain 216 to hot interface 908. Similarly, cold interface 906 is configured to contact an extended portion of a surface of reservoir 202 to facilitate increasing a heat transfer from cold interface 906 to reservoir 202.

With reference also to FIG. 9, a heat transport capability of heat pipe 902 depends upon the materials used for tube 904 and working fluid 912, the operational temperature of working fluid 912, and an outer diameter 918 of tube 904. In the exemplary embodiment of FIG. 11, heat pipe 902 includes tube 904 formed of copper with outer diameter 918 equal to approximately 0.5 inches and a working fluid 912 of water. As described above, second hydraulic system 104 generally may be, for example, 20 degrees Fahrenheit hotter than first hydraulic system 102, and fluid in case drain 216 may be, for example, approximately 30 degrees Fahrenheit hotter than fluid in reservoir 212. As a result, in the absence of heat exchange, second hydraulic fluid 211 flowing through case drain 216 may be, for example, approximately 50 degrees Fahrenheit higher than first hydraulic fluid 201 flowing through reservoir 202. At an operational temperature of 150 degrees Fahrenheit, heat pipe 902 has a heat transport capability of approximately 600 watts. The heat transport provided by heat pipe 902 from case drain 216 to reservoir 202 increases the temperature of first hydraulic fluid 201 and decreases the temperature of second hydraulic fluid 211, to result in a reduced temperature difference of, for example, 10 degrees Fahrenheit between first hydraulic fluid 201 and second hydraulic fluid 211. In an alternative embodiment, heat pipe 902 includes copper and water and has outer diameter 0.875 inches. In this alternative embodiment, heat pipe 902 has a heat transport capability of approximately 1,700 watts at an operational temperature of 150 degrees Fahrenheit, and the temperature difference between first hydraulic fluid 201 and second hydraulic fluid 211 may be reduced to, for example, 5 degrees Fahrenheit.

Figure 12:
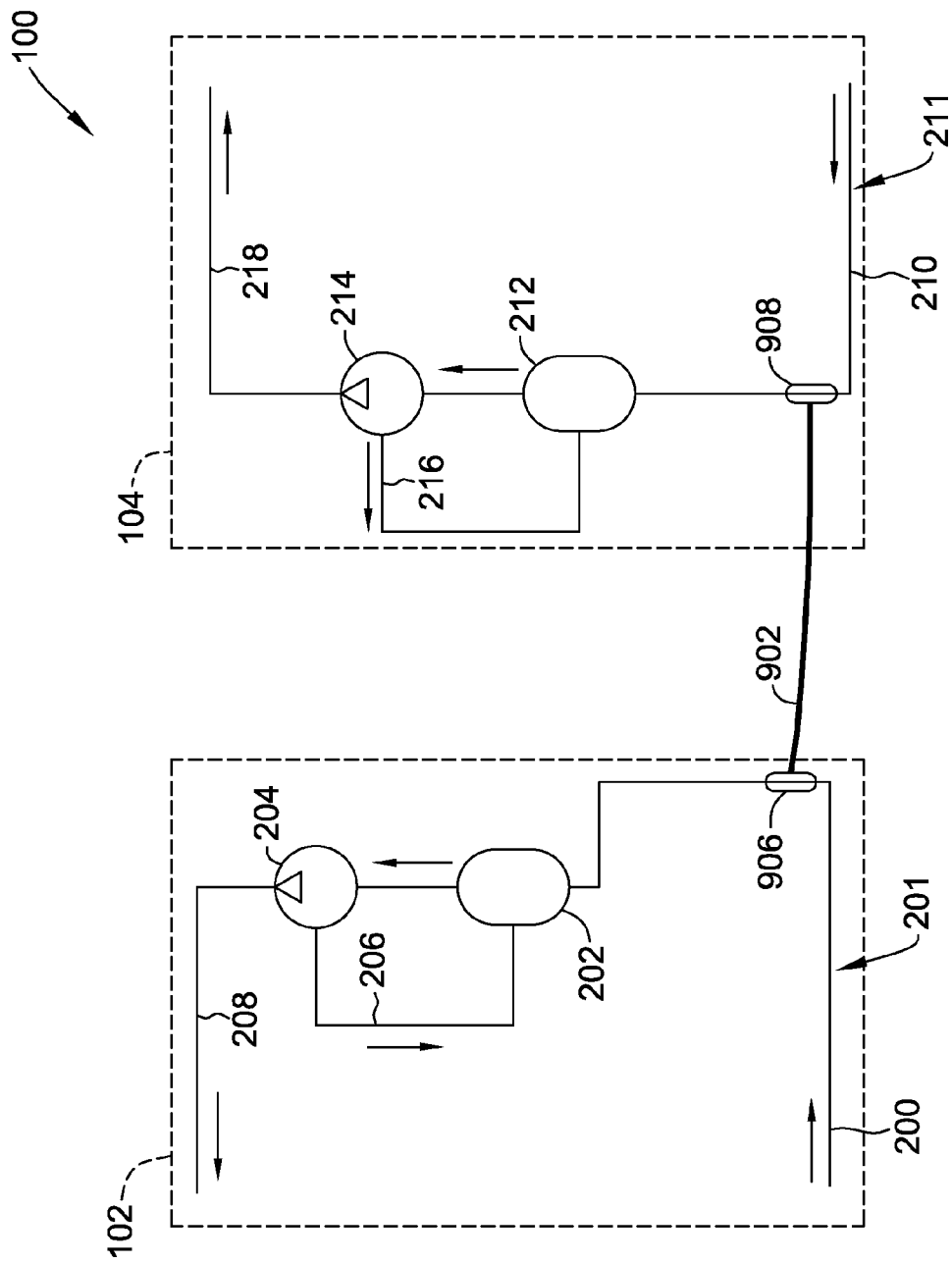
FIG. 12 is a block diagram of a fourth example configuration of the hydraulic systems of the aircraft of FIG. 1.

FIG. 12 is a block diagram of a fourth example configuration of first hydraulic system 102 and second hydraulic system 104 in which sealed heat transfer device 900, implemented as heat pipe 902, is coupled to first hydraulic system 102 and second hydraulic system 104. More specifically, cold interface 906 is coupled to return line 200 of first hydraulic system 102, and hot interface 908 is coupled to return line 210 of second hydraulic system 104. In the exemplary embodiment, hot interface 908 is configured to encapsulate a portion of return line 210 to facilitate increasing a heat transfer from return line 210 to hot interface 908. Similarly, cold interface 906 is configured to encapsulate a portion of return line 200 to facilitate increasing a heat transfer from cold interface 906 to return line 200. As described above, in the absence of heat exchange, second hydraulic fluid 211 flowing through return line 210 may be, for example, approximately 20 degrees Fahrenheit hotter than first hydraulic fluid 201 flowing through return line 200. Despite the relatively low temperature difference between cold interface 906 and hot interface 908, however, the relatively high heat transport capability of heat pipe 902 at such relatively low temperature differences facilitates effective heat transfer through heat pipe 902.

In certain embodiments, a larger heat transport capability is required to facilitate reducing a temperature of second hydraulic system 104 or increasing a temperature of first hydraulic system 102. In some embodiments, outer diameter 918 of tube 904 is increased further. Alternatively, a plurality (not shown) of heat pipes 902 may be installed between first hydraulic system 102 and second hydraulic system 104. For example, but not by way of limitation, a first heat pipe 902 may be installed between reservoir 202 of first hydraulic system 102 and case drain 216 of second hydraulic system 104 (as shown in FIG. 11), a second heat pipe 902 may be installed between return line 200 of first hydraulic system 102 and return line 210 of second hydraulic system 104 (as shown in FIG. 12), and/or a third heat pipe 902 (not shown) may be installed between return line 200 of first hydraulic system 102 and case drain 216 of second hydraulic system 104.

Figure 13:
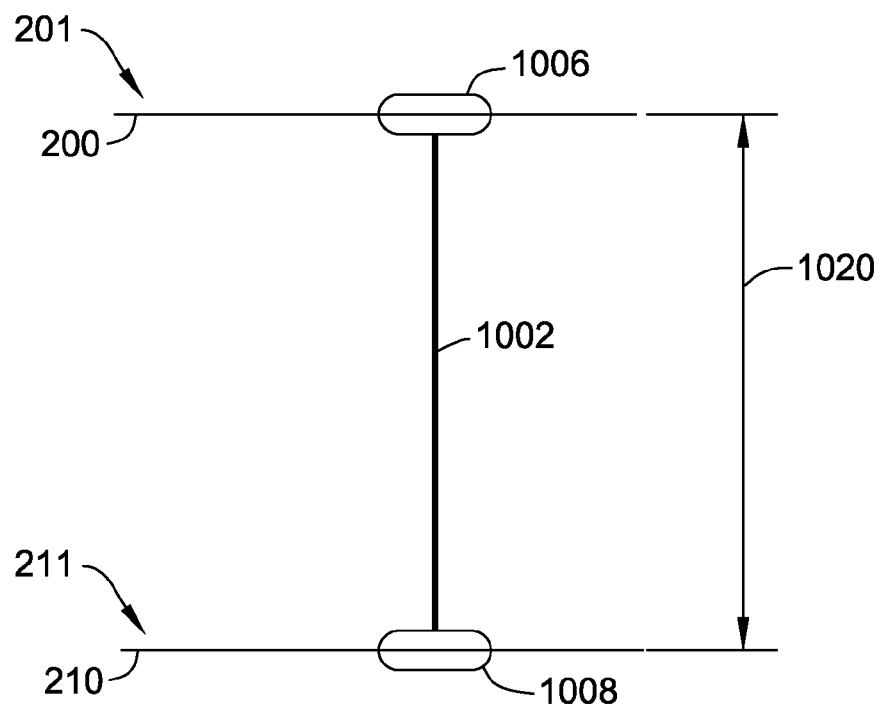
FIG. 13 is a schematic illustration of a fifth example configuration of the hydraulic systems of the aircraft of FIG. 1.
Figure 14:
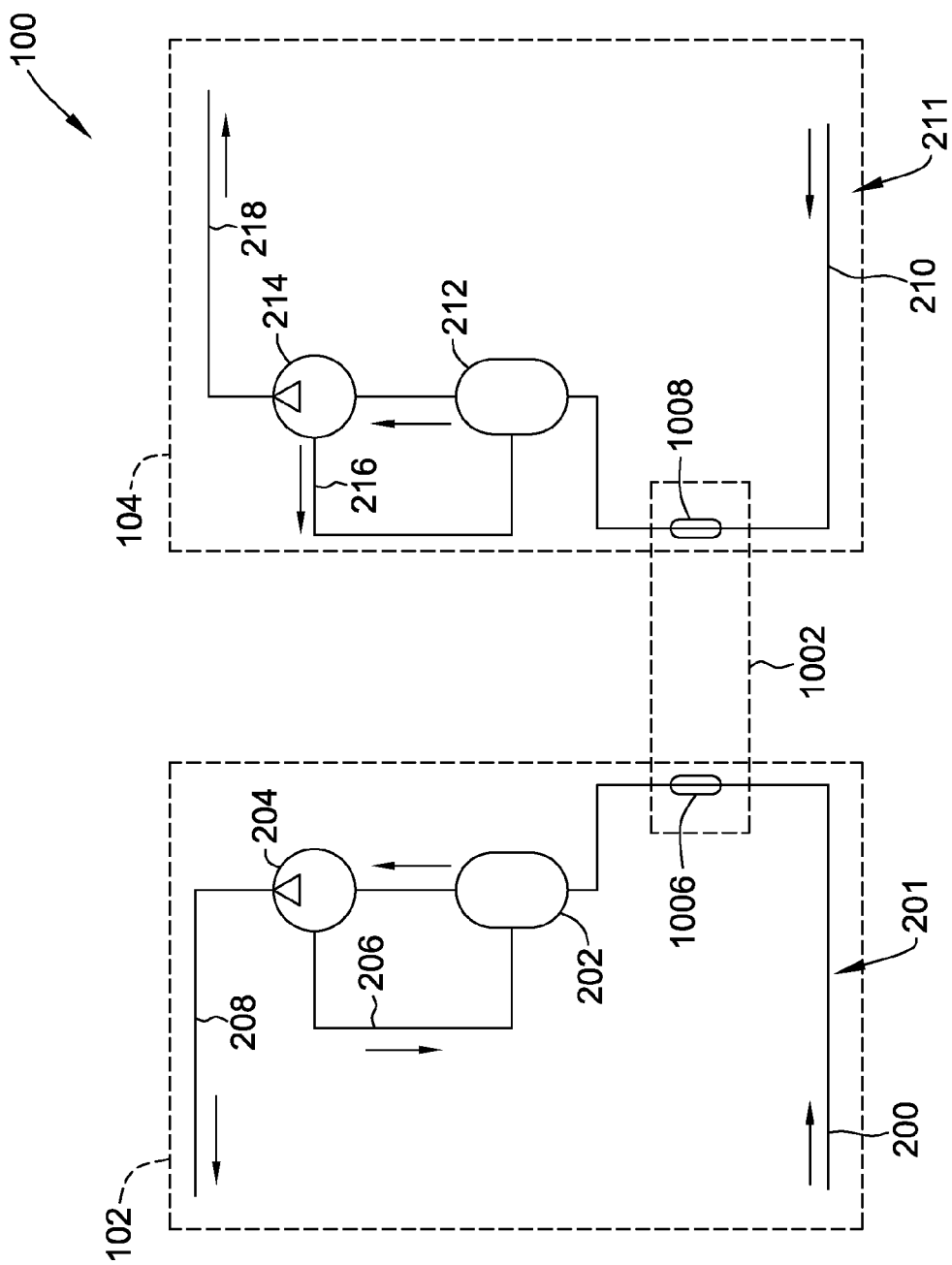
FIG. 14 is a block diagram of the fifth example configuration shown in FIG. 13 of the hydraulic systems of the aircraft of FIG. 1.

FIG. 13 is a schematic illustration and FIG. 14 is a block diagram of a fifth example configuration of first hydraulic system 102 and second hydraulic system 104 in which sealed heat transfer device 900, implemented as thermosyphon 1002, is coupled to first hydraulic system 102 and second hydraulic system 104. More specifically, cold interface 1006 is coupled to return line 200 of first hydraulic system 102, and hot interface 1008 is coupled to return line 210 of second hydraulic system 104. As described above, for thermosyphon 1002 to function properly, cold interface 1006 must have an elevation 1020 that is higher than hot interface 1008, as shown in FIG. 13. Thus, thermosyphon 1002 is suited for locations on aircraft 100 where a portion of return line 200 is at an elevation 1020 relative to a portion of return line 210 when aircraft 100 is in an operating orientation.

In the exemplary embodiment, hot interface 1008 is configured to encapsulate a portion of return line 210 to facilitate increasing a heat transfer from return line 210 to hot interface 1008. Similarly, cold interface 1006 is configured to encapsulate a portion of return line 200 to facilitate increasing a heat transfer from cold interface 1006 to return line 200. A heat transport capability of thermosyphon 1002 depends upon the materials used for tube 1004 and working fluid 1012, a temperature difference between cold interface 1006 and hot interface 1008, and an outer diameter 1018 of tube 1004 (as shown in FIG. 10) approximately in the same manner as described for heat pipe 902. In the exemplary embodiment of FIG. 13, thermosyphon 1002 includes tube 1004 formed of copper with outer diameter 1018 equal to approximately 0.5 inches and a working fluid 1012 of water. As described above, in the absence of heat exchange, second hydraulic fluid 211 flowing through return line 210 may be, for example, approximately 20 degrees Fahrenheit hotter than first hydraulic fluid 201 flowing through return line 200. At an operational temperature of 150 degrees Fahrenheit, thermosyphon 1002 has a heat transport capability of approximately 500 watts. In an alternative embodiment, thermosyphon 1002 includes copper and water and has outer diameter 0.875 inches. In this alternative embodiment, thermosyphon 1002 has a heat transport capability of approximately 1,800 watts at a 150 degree Fahrenheit operational temperature. Thus, as with heat pipe 902, the temperature difference between first hydraulic fluid 201 and second hydraulic fluid 211 may be reduced to, for example, 5 degrees Fahrenheit.

Figure 15:
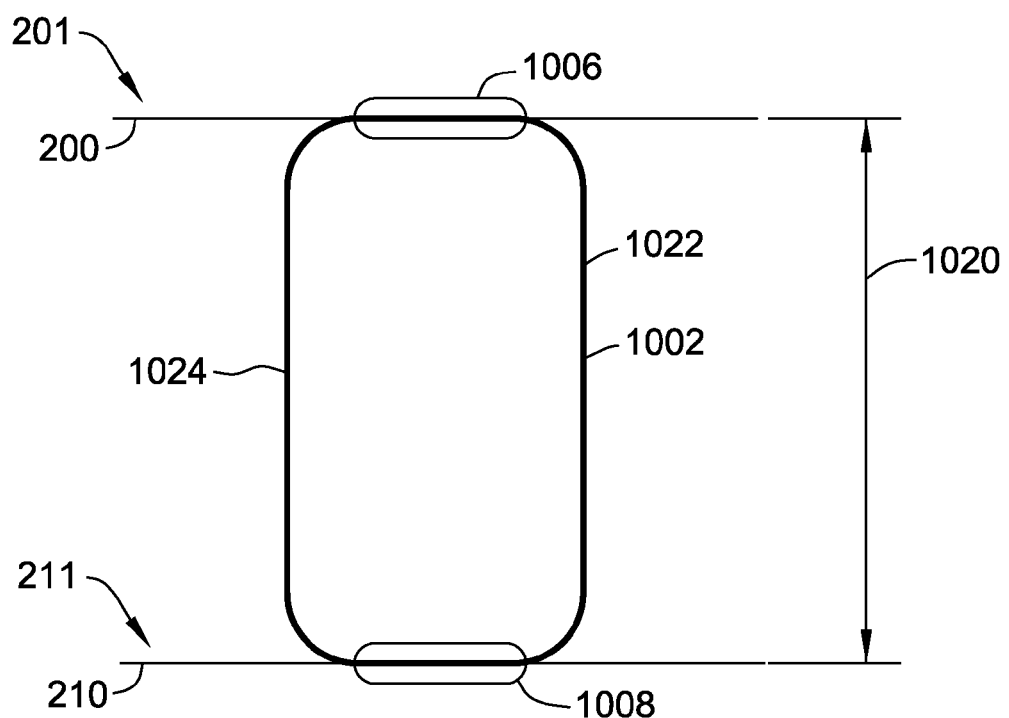
FIG. 15 is a schematic illustration of a sixth example configuration of the hydraulic systems of the aircraft of FIG. 1.

In certain embodiments, a larger heat transport capability is required to facilitate reducing a temperature of second hydraulic system 104 or increasing a temperature of first hydraulic system 102. In some embodiments, outer diameter 1018 of tube 1004 is increased to meet these requirements. Additionally or alternatively, a plurality (not shown) of thermosyphons 1002 may be installed between first hydraulic system 102 and second hydraulic system 104, as described previously with regard to a plurality of heat pipes 902. Alternatively, in a sixth example configuration of first hydraulic system 102 and second hydraulic system 104 illustrated schematically in FIG. 15, tube 1004 includes a vapor conduit 1022 and a liquid conduit 1024 coupled to cold interface 1006 and hot interface 1008 to form a loop. With reference also to FIG. 10, working fluid 1012 near hot interface 1008 absorbs heat, evaporates into vapor 1014, and rises through vapor conduit 1022 toward cold interface 1006. Working fluid 1012 near cold interface 1006 releases heat, condenses into liquid 1016, and flows down liquid conduit 1024 toward hot interface 1008. The use of vapor conduit 1022 and liquid conduit 1024 facilitates increasing a heat transfer efficiency of thermosyphon 1002 by reducing entrainment friction that arises when vapor 1014 and liquid 1016 travel past each other in opposite directions in tube 1004.

Figure 16:
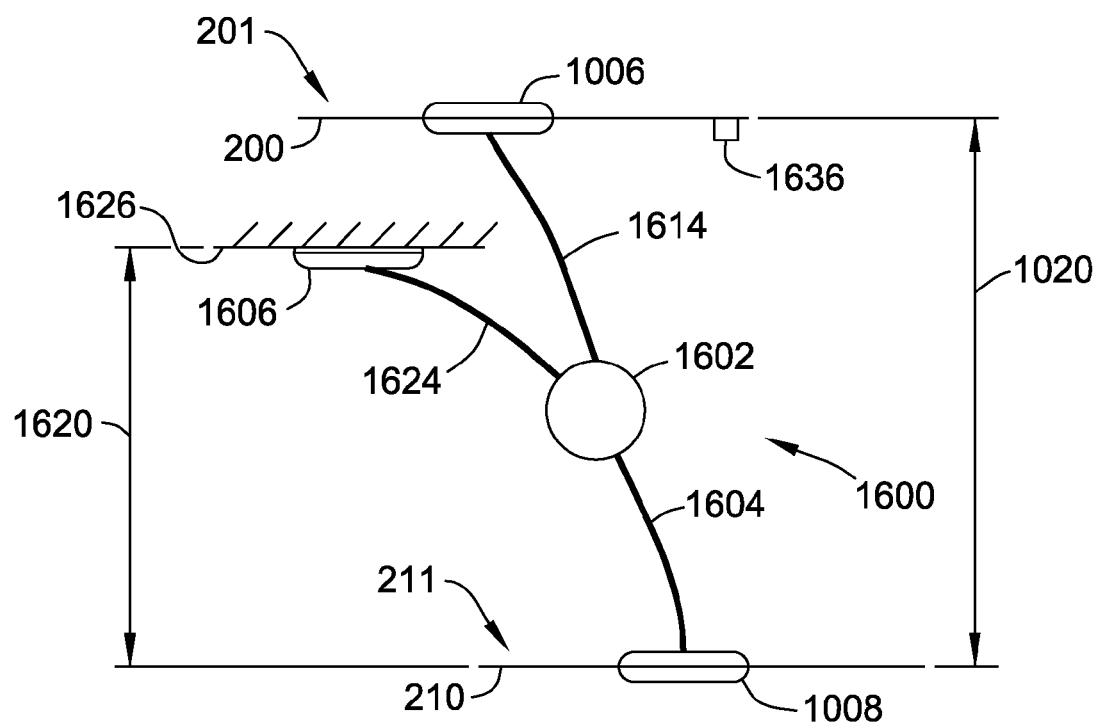
FIG. 16 is a schematic illustration of a seventh example configuration of the hydraulic systems of the aircraft of FIG. 1.

In some embodiments, a risk of system or component malfunction presents a risk that heat transfer between first hydraulic system 102 and second hydraulic system 104 eventually may lead to overheating of first hydraulic system 102. FIG. 16 is a schematic illustration of a seventh example configuration of first hydraulic system 102 and second hydraulic system 104, in which sealed heat transfer device 900 is implemented as a thermostat-regulated thermosyphon system 1600 that facilitates preventing a potential overheat condition. In the exemplary embodiment, thermosyphon system 1600 includes a thermostat 1602, a first tube 1604, a second tube 1614, and a third tube 1624. More specifically, first tube 1604 extends between hot interface 1008 and thermostat 1602, second tube 1614 extends between thermostat 1602 and cold interface 1006, and third tube 1624 extends between thermostat 1602 and a surface interface 1606. Thermostat 1602 is configured to selectively switch first tube 1604 between flow communication with second tube 1614 and flow communication with third tube 1624.

In certain embodiments, hot interface 1008 is coupled to second hydraulic system 104, cold interface 1006 is coupled to first hydraulic system 102, and surface interface 1606 is coupled to a structural surface 1626 of aircraft 100. For example, in the exemplary embodiment illustrated in FIG. 15, hot interface 1008 is coupled to return line 210 of second hydraulic system 104, cold interface 1006 is coupled to return line 200 of first hydraulic system 102, and surface interface 1606 is coupled to a surface 1626 of a skin of aircraft 100. In a particular embodiment, hot interface 1008 is configured to encapsulate a portion of return line 210 to facilitate increasing a heat transfer from return line 210 to hot interface 1008, cold interface 1006 is configured to encapsulate a portion of return line 200 to facilitate increasing a heat transfer from cold interface 1006 to return line 200, and surface interface 1606 is configured to contact an extended portion of surface 1626 to facilitate increasing a heat transfer from surface interface 1606 to surface 1626. In alternative embodiments, hot interface 1008 is coupled to a different location within second hydraulic system 104 and/or cold interface 1006 is coupled to a different location within first hydraulic system 102.

In a first operational condition, thermostat 1602 couples first tube 1604 in flow communication with second tube 1614, such that first tube 1604 and second tube 1614 cooperate to form a sealed heat transfer device 900. More specifically, and with reference also to FIG. 10, in the first operational condition, working fluid 1012 near hot interface 1008 absorbs heat from hot interface 1008 and evaporates into vapor 1014, which expands and travels upward through thermostat 1602 toward cold interface 1006. In turn, working fluid 1012 near cold interface 1006 loses heat to cold interface 1006 and condenses into liquid 1016, which travels downward through thermostat 1602 toward hot interface 1008. As previously described, elevation 1020 of cold interface 1006 relative to hot interface 1008 enables first tube 1604 and second tube 1614 to transfer heat despite the absence of a wicking structure. Thus, in the first operational condition, thermostat system 1600 substantially forms thermosyphon 1002 between return line 210 and return line 200.

In a second operational condition, thermostat 1602 couples first tube 1604 in flow communication with third tube 1624. A location of surface 1626 is chosen such that surface 1626 is at an elevation 1620 relative to hot interface 1008, and such that a temperature of surface 1626 is lower than a temperature of second hydraulic system 104 when thermosyphon system 1600 is in operation. As a result, in the second operational condition, first tube 1604 and third tube 1624 cooperate to form a sealed heat transfer device 900. More specifically, and with reference also to FIG. 10, in the second operational condition, working fluid 1012 near hot interface 1008 absorbs heat from hot interface 1008 and evaporates into vapor 1014, which expands and travels upward through thermostat 1602 toward surface interface 1606. In turn, working fluid 1012 near surface interface 1606 loses heat to surface interface 1606 and condenses into liquid 1016, which travels downward through thermostat 1602 toward hot interface 1008. Elevation 1620 of surface interface 1606 relative to hot interface 1008 enables first tube 1604 and third tube 1624 to transfer heat despite the absence of a wicking structure. Thus, in the second operational condition, thermostat system 1600 substantially forms thermosyphon 1002 between return line 210 and surface 1626.

Figure 17:
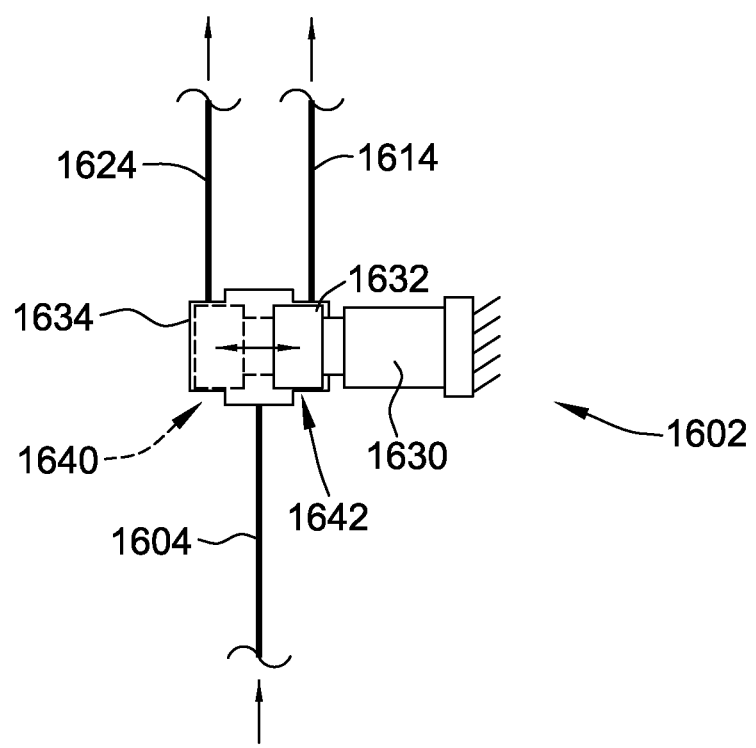
FIG. 17 is a schematic illustration of an exemplary embodiment of a thermostat for use with the seventh example configuration shown in FIG. 16 of the hydraulic systems of the aircraft of FIG. 1.

FIG. 17 is a schematic illustration of an exemplary embodiment of a thermostat 1602 for use with thermostat-regulated thermosyphon system 1600 shown in FIG. 16. In the exemplary embodiment, thermostat 1602 includes an actuator 1630 configured to move a valve 1632 between a first position 1640 and a second position 1642 within a housing 1634. When valve 1632 is in first position 1640, first tube 1604 is coupled in flow communication with second tube 1614, while third tube 1624 is substantially blocked from flow communication with first tube 1604 and second tube 1614. In some embodiments, positioning valve 1632 in first position 1640 implements the first operational condition described above. When valve 1632 is in second position 1642, first tube 1604 is coupled in flow communication with third tube 1624, while second tube 1614 is substantially blocked from flow communication with first tube 1604 and third tube 1624. In some embodiments, positioning valve 1632 in second position 1642 implements the second operational condition described above.

In certain embodiments, valve 1632 is positioned in first position 1640 at a commencement of an operation of aircraft 100, and if a temperature associated with first hydraulic system 102 exceeds a predetermined threshold value, actuator 1630 moves valve 1632 to second position 1642. For example, in the exemplary embodiment, actuator 1630 actuates valve 1632 in response to input from a temperature sensor 1636 (shown in FIG. 15) configured to measure a temperature of hydraulic fluid 201 flowing in return line 200 of first hydraulic system 102. If the temperature measured by sensor 1636 exceeds the predetermined threshold value, actuator 1630 moves valve 1632 to second position 1642. In certain embodiments, by switching the heat transfer sink of thermosyphon system 1600 from cold interface 1006, which transfers heat to first hydraulic system 102, to surface interface 1606, which transfers heat to surface 1626, thermostat 1602 facilitates preventing a potential overheat condition of first hydraulic system 102.

In the embodiment illustrated in FIGS. 16 and 17, sensor 1636 may communicate with actuator 1630 using a wired, wireless, or any other suitable connection (not shown). Moreover, in alternative embodiments, temperature sensor 1636 measures a temperature at a different location, such as at another location within first hydraulic system 102 or an ambient temperature that can be correlated with an approximate temperature of first hydraulic system 102. In still other embodiments, actuator 1630 actuates valve 1632 in response to an average of a plurality of temperatures measured at a plurality of corresponding locations, and the predetermined threshold temperature is a predetermined threshold average temperature.

In certain embodiments, sealed heat transfer devices 900, such as heat pipe 902, thermosyphon 1002, and thermosyphon system 1600, provides an advantage over heat exchangers 106 having first tube 120 coupled in flow communication with first hydraulic system 102 and second tube 122 coupled in flow communication with second hydraulic system 104. In particular, safety regulations may require that, in certain embodiments, all components in flow communication with first hydraulic system 102 are located at least a required distance, such as for example three feet, from all components in flow communication with second hydraulic system 104 to mitigate a risk of single-event damage to both first hydraulic system 102 and second hydraulic system 104. Because sealed heat transfer devices 900 are not in flow communication with either first hydraulic system 102 or second hydraulic system 104, it is not necessary to locate any component of first hydraulic system 102 within the minimum separation distance of any component of second hydraulic system 104 to achieve efficient heat transfer through sealed heat transfer devices 900.

In certain embodiments, with reference to FIGS. 11 and 12, a length of heat pipe 902 is in the range of about three feet to about ten feet. In alternative embodiments, heat pipe 902 has a length of more than ten feet or less than three feet. Moreover, in certain embodiments, with reference to FIGS. 13 and 14, a length of thermosyphon 1002 is in the range of about three feet to about ten feet. In alternative embodiments, thermosyphon 1002 has a length of more than ten feet or less than three feet. Similarly, in certain embodiments, with reference to FIG. 16, a combined length of first tube 1604 and second tube 1614 is in the range of about three feet to about ten feet. In alternative embodiments, first tube 1604 and second tube 1614 have a combined length of more than ten feet or less than three feet. Thus, sealed heat transfer devices 900 facilitate heat transfer between first hydraulic system 102 and second hydraulic system 104 while maintaining a desired minimum separation distance between components in flow communication with first hydraulic system 102 and components in flow communication with second hydraulic system 104.

Figure 18:
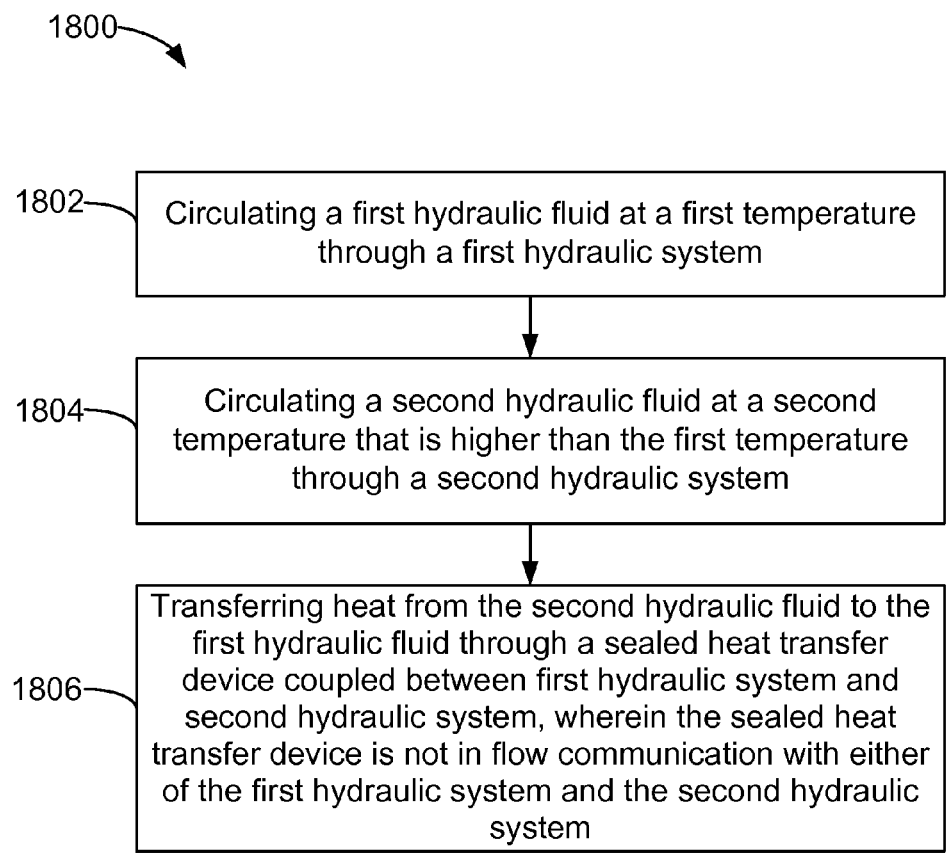
FIG. 18 is a flowchart of another exemplary method for managing temperatures in a machine, such as the aircraft of FIG. 1.

FIG. 18 is a flowchart of another exemplary method 1800 for managing temperatures in a machine, such as aircraft 100 (shown in FIG. 1). Exemplary method 1800 includes circulating 1802 a first hydraulic fluid, for example first hydraulic fluid 201, at a first temperature through a first hydraulic system, for example first hydraulic system 102. First hydraulic system 102 is coupled to a machine, for example aircraft 100. Additionally, method 1800 includes circulating 1804 a second hydraulic fluid, for example second hydraulic fluid 211, at a second temperature that is higher than the first temperature through a second hydraulic system, for example second hydraulic system 104. Second hydraulic system 104 is coupled to the machine, for example aircraft 100. Method 1800 additionally includes transferring 1806 heat from the second hydraulic fluid 211 to the first hydraulic fluid 201 through a sealed heat transfer device coupled between first hydraulic system 102 and second hydraulic system 104. The sealed heat transfer device may be, for example, sealed heat transfer device 900, such as heat pipe 902, thermosyphon 1002, or thermosyphon system 1600. The sealed heat transfer device is not in flow communication with either of first hydraulic system 102 and second hydraulic system 104.

As compared to known methods and systems for heating or cooling hydraulic fluid within an aircraft, the methods and systems described herein facilitate both heating and cooling hydraulic fluid with the same setup, and in a more efficient and cost-effective way by coupling hydraulic systems of different temperatures together with a heat exchanger or a sealed heat transfer device, such as a heat pipe or thermosyphon. Moreover, the methods and systems described herein facilitate preventing a potential overheat condition of hydraulic systems by providing a thermostat-regulated heat transfer system. In addition, the methods and systems described herein facilitate both heating and cooling of hydraulic fluid within different hydraulic systems while maintaining a desired minimum separation distance between components in flow communication with the first system and components in flow communication with the second system.

The description of the different advantageous implementations has been presented for purposes of illustration and description, and is not intended to be exhaustive or limited to the implementations in the form disclosed. Many modifications and variations will be apparent to those of ordinary skill in the art. Further, different advantageous implementations may provide different advantages as compared to other advantageous implementations. The implementation or implementations selected are chosen and described in order to best explain the principles of the implementations, the practical application, and to enable others of ordinary skill in the art to understand the disclosure for various implementations with various modifications as are suited to the particular use contemplated. This written description uses examples to disclose various implementations, which include the best mode, to enable any person skilled in the art to practice those implementations, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A thermal management system comprising: a first hydraulic system for circulating a first hydraulic fluid to at least a first hydraulically activated component, said first hydraulic system comprising a first pump, a first case drain line, a first reservoir, and a first return line coupled between said first hydraulically activated component and said first reservoir; a second hydraulic system for circulating a second hydraulic fluid to at least a second hydraulically activated component, said second hydraulic system comprising a second pump, a second reservoir, and a second case drain line coupled between said second pump and said second reservoir; and a sealed heat transfer device coupled between said first reservoir and said second case drain line, said sealed heat transfer device is not in flow communication with either of said first reservoir and said second case drain line, wherein said sealed heat transfer device is configured to transfer heat from the second hydraulic fluid to the first hydraulic fluid such that a temperature of the first hydraulic fluid in said first reservoir is stabilized above a threshold temperature that corresponds to a threshold amount of hydraulic power for operation of said first hydraulically operated component, wherein said sealed heat transfer device comprises: a cold interface coupled to said first hydraulic system; a hot interface coupled to said second hydraulic system; a sealed tube extending longitudinally between said cold interface and said hot interface; and a working fluid disposed within said tube in an amount such that said working fluid exists partially in a liquid phase and partially in a vapor phase within said tube throughout an operating temperature range of said sealed heat transfer device, wherein said sealed heat transfer device further comprises a wicking structure extending longitudinally within at least a portion of said tube, said wicking structure configured to induce liquid to flow therethrough due to capillary action.

2. The thermal management system of claim 1, wherein said sealed heat transfer device extends across a distance of at least three feet such that all components in flow communication with said first hydraulic system are located at least three feet from all components in flow communication with said second hydraulic system.

3. The thermal management system of claim 1, wherein an elevation of said cold interface relative to said hot interface is sufficient to allow vapor heated by said hot interface to rise toward said cold interface due to natural buoyancy.

4. The thermal management system of claim 1, wherein said sealed heat transfer device comprises:
a cold interface coupled to said first hydraulic system;
a hot interface coupled to said second hydraulic system;
a surface interface coupled to a structural surface;
a thermostat;
a first tube extending between said hot interface and said thermostat;
a second tube extending between said thermostat and said cold interface; and
a third tube extending between said thermostat and said surface interface, wherein said thermostat is configured to selectively switch said first tube between flow communication with said second tube, such that said first tube and said second tube form a thermosyphon extending between said hot interface and said cold interface, and flow communication with said third tube, such that said first tube and said third tube form a thermosyphon extending between said hot interface and said surface interface.

5. The thermal management system of claim 4, wherein said thermostat is further configured to selectively switch said first tube from flow communication with said second tube into flow communication with said third tube when a temperature associated with said first hydraulic system exceeds a predetermined threshold value.

6. An aircraft comprising: a first hydraulic system for circulating a first hydraulic fluid to at least a first hydraulically activated component, said first hydraulic system comprising a first pump, a first case drain line, a first reservoir, and a first return line coupled between said first hydraulically activated component and said first reservoir; a second hydraulic system for circulating a second hydraulic fluid to at least a second hydraulically activated component, said second hydraulic system comprising a second pump, a second reservoir, and a second case drain line coupled between said second pump and said second reservoir; and a sealed heat transfer device coupled between said first reservoir and said second case drain line, said sealed heat transfer device is not in flow communication with either of said first reservoir and said second case drain line, wherein said sealed heat transfer device is configured to transfer heat from the second hydraulic fluid to the first hydraulic fluid such that a temperature of the first hydraulic fluid in said first reservoir is stabilized above a threshold temperature that corresponds to a threshold amount of hydraulic power for operation of said first hydraulically operated component, wherein said sealed heat transfer device comprises: a cold interface coupled to said first hydraulic system; a hot interface coupled to said second hydraulic system; a sealed tube extending longitudinally between said cold interface and said hot interface; and a working fluid disposed within said tube in an amount such that said working fluid exists partially in a liquid phase and partially in a vapor phase within said tube throughout an operating temperature range of said sealed heat transfer device, wherein said sealed heat transfer device further comprises a wicking structure extending longitudinally within at least a portion of said tube, said wicking structure configured to induce liquid to flow therethrough due to capillary action.

7. The aircraft of claim 6, wherein said sealed heat transfer device extends across a distance of at least three feet such that all components in flow communication with said first hydraulic system are located at least three feet from all components in flow communication with said second hydraulic system.

8. The aircraft of claim 6, wherein an elevation of said cold interface relative to said hot interface is sufficient to allow vapor heated by said hot interface to rise toward said cold interface due to natural buoyancy.

9. The aircraft of claim 6, wherein said sealed heat transfer device comprises:
a cold interface coupled to said first hydraulic system;
a hot interface coupled to said second hydraulic system;
a surface interface coupled to a structural surface;
a thermostat;
a first tube extending between said hot interface and said thermostat;
a second tube extending between said thermostat and said cold interface; and
a third tube extending between said thermostat and said surface interface, wherein said thermostat is configured to selectively switch said first tube between flow communication with said second tube, such that said first tube and said second tube cooperate to form a thermosyphon extending between said hot interface and said cold interface, and flow communication with said third tube, such that said first tube and said third tube cooperate to form a thermosyphon extending between said hot interface and said surface interface.

10. The aircraft of claim 9, wherein said thermostat is further configured to selectively switch said first tube from flow communication with said second tube into flow communication with said third tube when a temperature associated with said first hydraulic system exceeds a predetermined threshold value.

11. The aircraft of claim 6, further comprising at least one engine, wherein said first hydraulic system is coupled to said at least one engine.

12. The aircraft of claim 6, further comprising landing gear, wherein said second hydraulic system is coupled to said landing gear.

13. A method for managing temperatures in a machine, said method comprising: circulating a first hydraulic fluid through a first hydraulic system and to at least a first hydraulically activated component in the machine, the first hydraulic system including a first pump, a first case drain line, a first reservoir, and a first return line coupled between the first hydraulically activated component and the first reservoir; circulating a second hydraulic fluid through a second hydraulic system and to at least a second hydraulically activated component in the machine, the second hydraulic system including a second pump, a second reservoir, and a second case drain line coupled between the second pump and the second reservoir; and transferring heat from the second hydraulic fluid to the first hydraulic fluid such that a temperature of the first hydraulic fluid in the first reservoir is stabilized above a threshold temperature that corresponds to a threshold amount of hydraulic power for operation of the first hydraulically operated component, wherein the heat is transferred through a sealed heat transfer device coupled between the first reservoir and the second case drain line, wherein the sealed heat transfer device is not in flow communication with either of the first hydraulic system and the second hydraulic system, further comprising:
coupling a cold interface to the first hydraulic system;
coupling a hot interface to the second hydraulic system;
coupling a sealed tube longitudinally between the cold interface and the hot interface; and disposing a working fluid within the tube in an amount such that the working fluid exists partially in a liquid phase and partially in a vapor phase within the tube throughout an operating temperature range of the sealed heat transfer device, and wherein said sealed heat transfer device comprises a wicking structure.

14. The method of claim 13, further comprising:
coupling a cold interface to the first hydraulic system;
coupling a hot interface to the second hydraulic system;
coupling a surface interface to a structural surface;
coupling a first tube between the hot interface and a thermostat;
coupling a second tube between the thermostat and the cold interface;
coupling a third tube between the thermostat and the surface interface; and
configuring the thermostat to selectively switch the first tube between flow communication with the second tube, such that the first tube and the second tube cooperate to form a thermosyphon extending between the hot interface and the cold interface, and flow communication with the third tube, such that the first tube and the third tube cooperate to form a thermosyphon extending between the hot interface and the surface interface.

15. The method of claim 14, wherein said configuring the thermostat further comprises configuring the thermostat to selectively switch the first tube from flow communication with the second tube into flow communication with the third tube when a temperature associated with the first hydraulic system exceeds a predetermined threshold value.

* * * * *